(12) United States Patent
Sugiyama

(10) Patent No.: US 7,256,897 B2
(45) Date of Patent: Aug. 14, 2007

(54) THREE-DIMENSIONAL MEASUREMENT APPARATUS AND THREE-DIMENSIONAL MEASUREMENT METHOD

(75) Inventor: Toshinobu Sugiyama, Kanagawa (JP)

(73) Assignee: Sony Corporation (JP)

( * ) Notice: Subject to any disclaimer, the term of this patent is extended or adjusted under 35 U.S.C. 154(b) by 448 days.

(21) Appl. No.: 10/760,404

(22) Filed: Jan. 21, 2004

(65) Prior Publication Data
US 2004/0150837 A1 Aug. 5, 2004

(30) Foreign Application Priority Data
Jan. 30, 2003 (JP) ............................ P2003-021359

(51) Int. Cl.
*G01B 11/24* (2006.01)
(52) U.S. Cl. ...................................... 356/604; 382/154
(58) Field of Classification Search ........ 356/603–605; 382/154
See application file for complete search history.

(56) References Cited

U.S. PATENT DOCUMENTS 5,189,493 A * 2/1993 Harding ...................... 356/605
5,193,120 A * 3/1993 Gamache et al. ............ 382/286
6,868,194 B2 * 3/2005 Tu et al. ....................... 382/312

FOREIGN PATENT DOCUMENTS

| JP | 2001-108418 | 4/2001 |
| JP | 2001-280926 | 10/2001 |
| JP | 2003-169251 | 6/2003 |

* cited by examiner

*Primary Examiner*—Richard A. Rosenberger
(74) *Attorney, Agent, or Firm*—Rader Fishman & Grauer PLLC; Ronald P. Kananen

(57) ABSTRACT

There is provided an apparatus and method for three-dimensional measurements by shining an object to be measured with plural laser beams while scanning. Even if the optical intensity of laser beams is weak, light disturbance is accurately separated to perform real-time three-dimensional measurement. A laser beam emitted from a laser source is separated into the plural beams of slit light with a predetermined angle at a hologram plate. These two beams are used for scanning and irradiating the object by a scanning mirror. These beams are reflected and read to determine whether or not an interval between these beams corresponds to the predetermined angle.

9 Claims, 7 Drawing Sheets

| FRAME DATA BIT SEQUENCE (5-BIT) | DATA COUNT BIT SEQUENCE (3-BIT) | FRAME COUNT BIT SEQUENCE (7-BIT) |

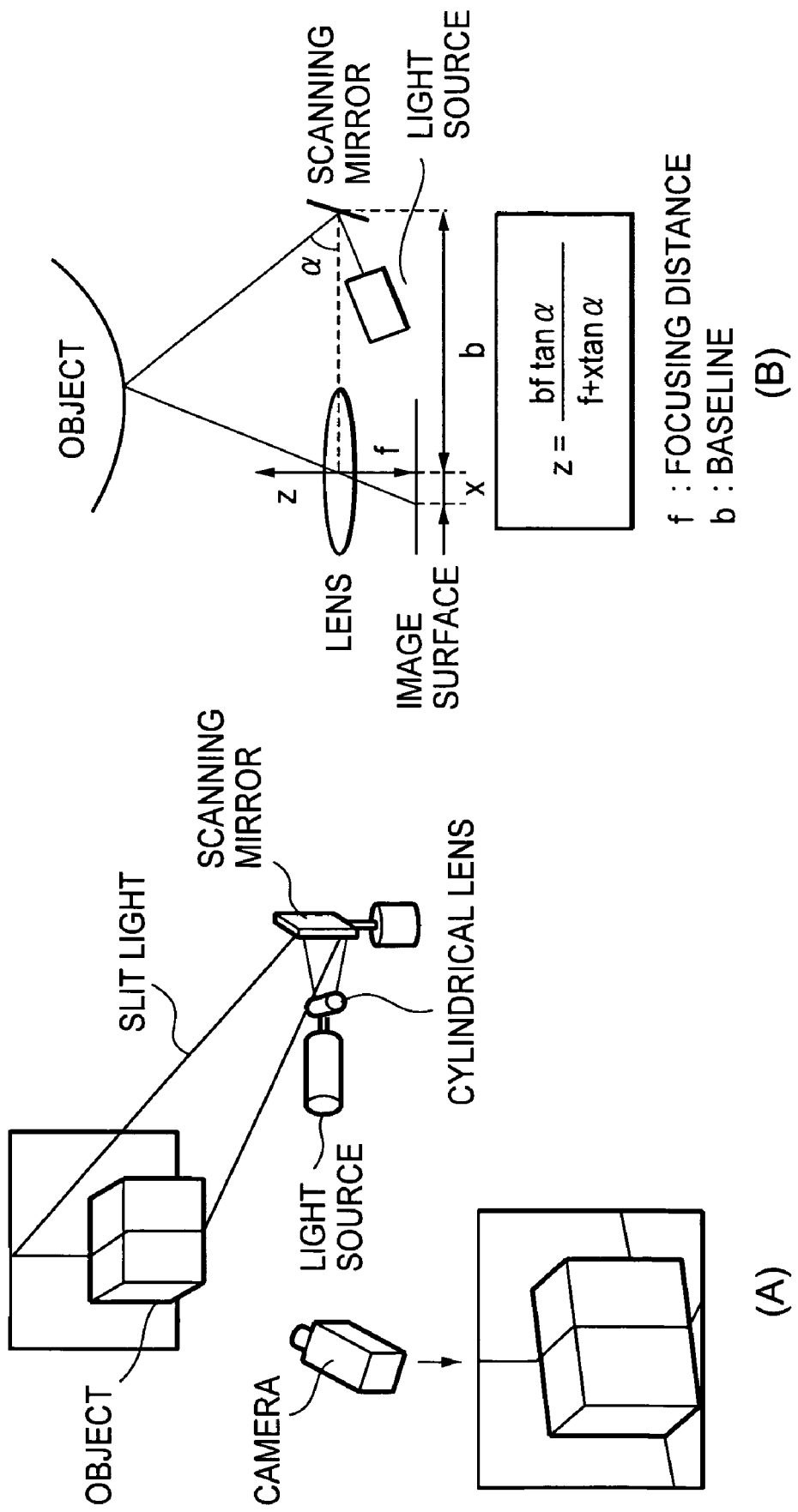

THREE-DIMENSIONAL MEASUREMENT APPARATUS AND THREE-DIMENSIONAL MEASUREMENT METHOD

CROSS REFERENCES TO RELATED APPLICATIONS

The present invention claims priority to its priority document No. 2003-021359 filed in the Japanese Patent Office on Jan. 30, 2003, the entire contents of which are incorporated by reference herein.

BACKGROUND OF THE INVENTION

1. Field of the Invention

The present invention relates to a three-dimensional measurement apparatus and a three-dimensional measurement method for measuring the three-dimensional shape of an object to be measured by radiating and scanning the object with a laser beam and reading reflected light therefrom.

2. Description of the Related Art

One of the currently available methods for obtaining three-dimensional profile information of an object is an optical sectioning method. As shown in FIG. 7, slit light is projected to an object while scanning it, and reflected light therefrom is received by an image sensor of a camera. By measuring timings on which the reflected light is received per pixel, a distance from an imaging surface of the image sensor to an object to be measured is measured in accordance with the principle of triangulation (for example, refer to Japanese Patent Application Laid-Open Publication No. 2001-280926, Japanese Patent Application Laid-Open Publication No. 2001-108418).

Typically, in the above-mentioned optical sectioning method, a typical CCD image sensor is employed for receiving light. In this case, the frame rate is limited to about 30 fps. If it is desirable to maintain a certain degree of distance resolution, the scanning rate has to be slowed down, thus making it difficult to use for real-time measuring of a moving object.

In order to address the above point, a system that enables a high-speed measurement by improving an image sensor is disclosed in Japanese Patent Application No. 2001-287625 (Japanese Patent Application Laid-Open Publication No. 2003-169251, Published Date: Jun. 13, 2003).

In FIG. 6 of the above-mentioned Japanese Patent Application Laid-Open Publication No. 2003-169251, the principle of triangulation and the principle of three-dimensional measurement based on a laser slit light are described.

The above-mentioned system is designed for allowing each pixel to detect a passing timing of the slit light at a high speed by carrying out a differential calculation with a high frame rate inside the image sensor. In the above-mentioned system, it is possible to measure a distance image at 15 fps or 30 fps by means of carrying out the differential calculation by the image sensor at 3.3 kfps.

SUMMARY OF THE INVENTION

However, a time period for receiving light in the above-mentioned image sensor is limited since the image sensor operates based on the principle that reflected light is detected by the high-speed frame operation. Accordingly, it is likely to require operations such as increasing the intensity of the projected light or increasing the sensitivity of a comparator circuit that carries out the differential calculation between frames if a distance to an object to be measured is larger or an object to be measured has a poor reflection rate for the slit light.

In such a case, applications thereof may be limited. For example, in utilizing such a system for measuring face profile data of a human being, the intensity of projected light is restricted in view of the need for safety regarding the intensity of light entering the human eyes. Further, if the sensitivity of the comparator circuit is increased, the possibility of so-called false detections increases because the higher comparator circuit's sensitivity results in higher sensor sensitivity on a change of the light intensity and causes the image sensor to respond even to a minute change in environment light.

Accordingly, in a real-time, three-dimensional measurement system such as the one described above, it is desirable to decrease the output of the light source in view of the safety of the projected light or the conservation of energy consumption.

Further, in such a system, it is desirable to provide a measure to facilitate discrimination between a change of the environmental light and a change of light due to a passage of the projected light.

The present invention has been made to address the above-mentioned point. According to one embodiment of the present invention, there is provided a three-dimensional measurement apparatus for measuring a three-dimensional shape of an object to be measured by irradiating and scanning the object with a laser light. The apparatus includes optical means for dividing the laser light into a plurality of beams with a predetermined angle in between for the irradiation; and discriminating means for reading out and discriminating each of a plurality of reflected laser light beams, the plurality of the reflected laser light beams corresponding to the plurality of divided beams, respectively, the plurality of divided beams being used for the irradiation by the optical means.

According to another embodiment of the present invention, there is provided a three-dimensional measurement method for measuring a three-dimensional shape of an object to be measured by irradiating and scanning the object with a laser light. The method includes the steps of dividing the laser light into a plurality of beams with a predetermined angle in between for the irradiation, and reading out and discriminating each of a plurality of reflected laser light beams, the plurality of the reflected laser light beams corresponding to the plurality of divided beams, respectively, the plurality of divided beams being used for the irradiation.

In an embodiment of the present invention, a laser beam is divided into a plurality of beams with a predetermined angle in between. The plurality of beams are used for irradiating and scanning an object to be measured. A plurality of reflected light beams from the object are read and discriminated. An operation is performed to determine whether or not the read-out reflected light beams are detected with an interval corresponding to the predetermined angle. If the interval between the read-out reflected light beams corresponds to the predetermined angle, it is determined that the read-out reflected light beams are indeed beams of light reflected on the object to be measured, and a three-dimensional shape data is generated based on the read-out reflected light beams. If the interval between the reflected light beams does not correspond to the predetermined angle, it is determined that the read-out reflected light beams are caused by a light disturbance, and data based on the read-out reflected light beams is not used for generating the three-dimensional shape data.

BRIEF DESCRIPTION OF THE DRAWINGS

These and other objects, features and advantages of the present invention will become more apparent in light of the following detailed description of a best mode embodiment thereof, as illustrated in the accompanying drawings:

FIG. 7 is a diagram explaining a three-dimensional measurement according to a conventional optical sectioning method.

DETAILED DESCRIPTION OF THE EMBODIMENTS

Below, embodiments of the present invention will be described with reference to the drawings.

Figure 1:
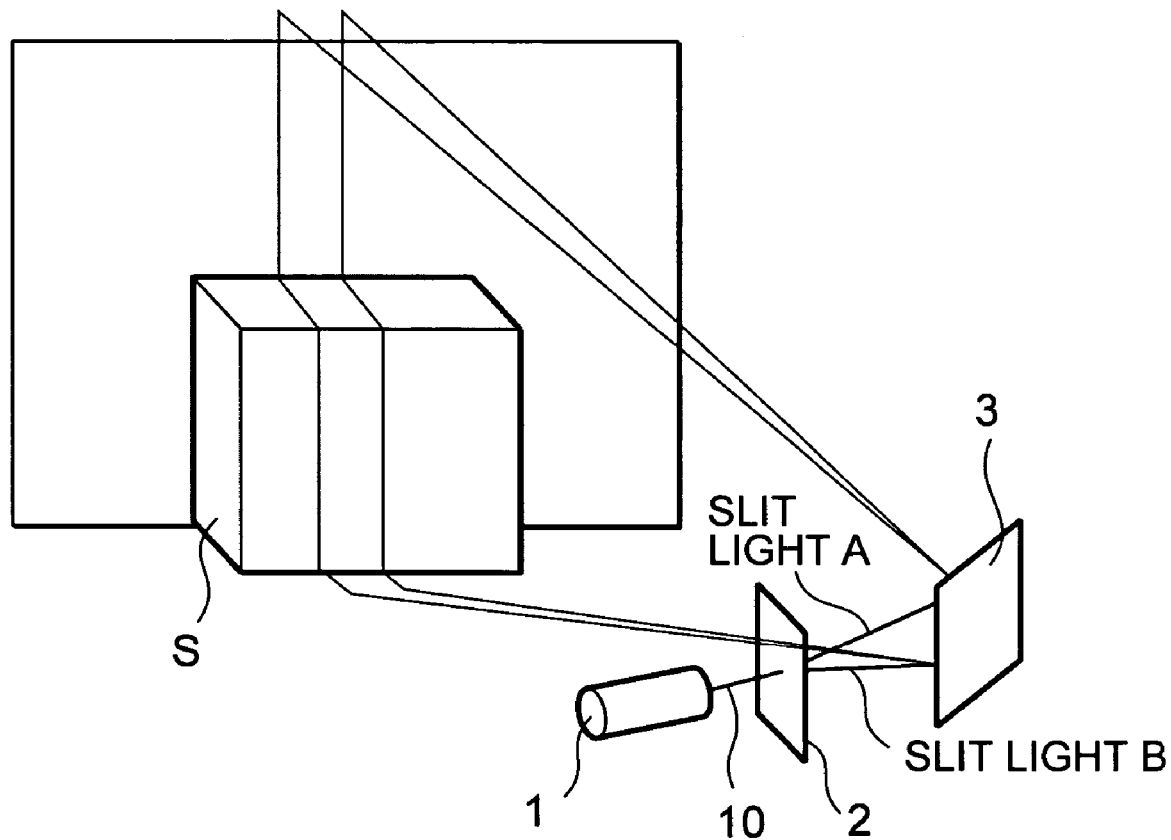
FIG. 1 is a diagram showing a concept of a three-dimensional measurement apparatus according to an embodiment of the present invention.

FIG. 1 is a diagram showing a concept of a three-dimensional measurement apparatus of an embodiment according to the present invention. The three-dimensional measurement apparatus of the present embodiment includes a laser source 1 emitting a beam of laser light, a hologram plate 2 that separates a beam of laser light 10 emitted from the laser source 1 into a plurality of light beams by a predetermined angle, and a scanning mirror 3 that reflects the plurality of laser light beams formed by the separation occurred in the hologram plate 2 and scans an object S to be measured with the plurality of laser light beams.

The hologram plate 2 is capable of converting the laser light beam 10 emitted from the laser source 1 into any arbitrary pattern. In an example of the present embodiment, it is so arranged that the laser light beam 10 emitted from the laser source 1 may be divided into two line-shaped laser beams (slit light A and slit light B) with a predetermined angle in between.

The scanning mirror 3 is so designed that it makes an oscillation movement within a predetermined angle and reflects the plurality of laser light beams from the hologram plate 2 (slit light A and slit light B) toward the object S to be measured.

Figure 2:
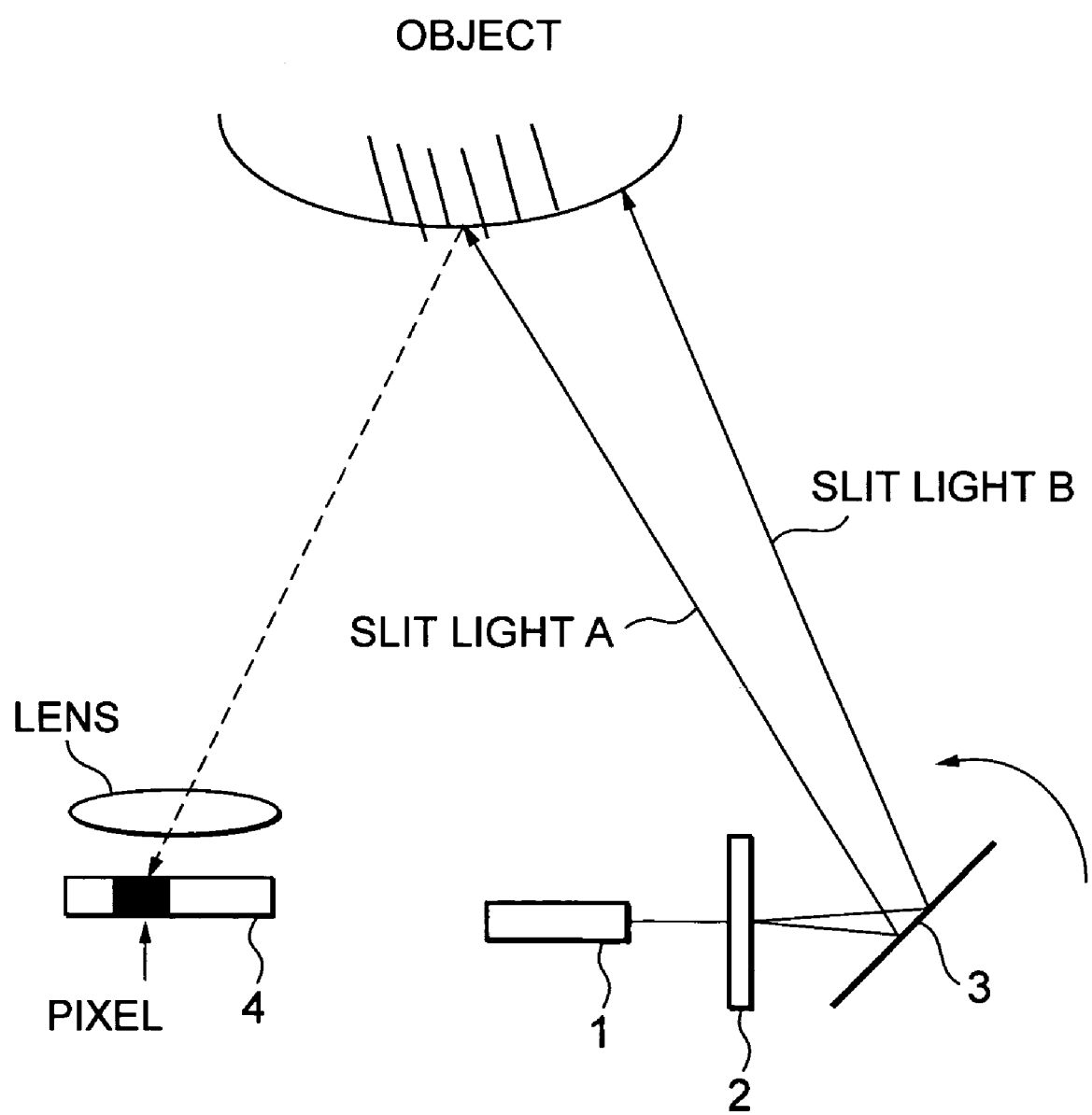
FIG. 2 is a view, which is viewed from above, of a three-dimensional measurement apparatus according to the embodiment shown in FIG. 1.

FIG. 2 is a view of the three-dimensional measurement apparatus of the present embodiment shown in FIG. 1, which is viewed from above. After the beam shaped light emitted from the laser source 1 passes through the hologram plate 2, the beam of light is converted into two slit-shaped beams of light with a certain constant separation angle. Then, in a way similar to a system based on a typical optical sectioning method, these slit-shaped beams of light are radiated to the object to be measured by the scanning mirror 3 that performs a scanning operation.

In the present example, a sensor 4 detects reflected light of the slit-shaped light beams, and the two light beams, i.e., the slit light A and the slit light B, are subjected to a sweeping operation with a constant angle all the time. Accordingly, at each pixel, the slit light B will be detected at a constant period of time or a constant number of frame operations after the detection of the slit light A, providing that the speed of the scanning operation of the scanning mirror 3 is constant. The present embodiment is characterized by discriminating two beams of the slit light A and the slit light B so as to acquire an accurate three-dimensional shape.

In the related art techniques, the passage of a single beam of the slit light is detected by measuring an optical intensity change in time (differential operation of signals between the frames). Accordingly, a false detection may be caused due to the fact that it is difficult to determine if the detected light intensity change is caused by the real passage of the laser light or a light disturbance that occurred in its background environment, thereby making it difficult to perform an accurate three-dimensional measurement.

On the other hand, according to the three-dimensional measurement apparatus according to the present embodiment, the passage of the slit light may be easily discriminated from the light disturbance in the background environment by making the slit light into two beams and detecting the passage of the slit light only if both beams of the slit light are detected as having a constant time period in between the detections of the two beams.

A sensor disclosed in Japanese Patent Application No. 2001-287625 (Japanese Patent Application Laid-Open Publication No. 2003-169251) is provided with a comparator to carry out differential operation between frames for detection of a passage of reflected laser light. In this related art, an offset bias is intentionally applied between frames so as to prevent detections of weak light disturbances in the background environment because a higher comparator sensitivity may increase the possibility of detecting such weak light disturbances, thereby making it difficult to perform accurate three-dimensional measurements.

However, such an offset biasing operation may also reduce the sensitivity for detecting changes of optical intensity caused by the reflected laser light, thereby making it difficult to carry out high-speed measurements or measurements by using a low-output light source.

In the present embodiment, by providing the two beams of slit light, it is possible not only to eliminate the light disturbance but also to prevent the false detections that. Accordingly, the offset bias may be either eliminated or considerably reduced, thus enabling the improvement of the sensitivity for detecting changes of the reflected laser light.

Figure 3:
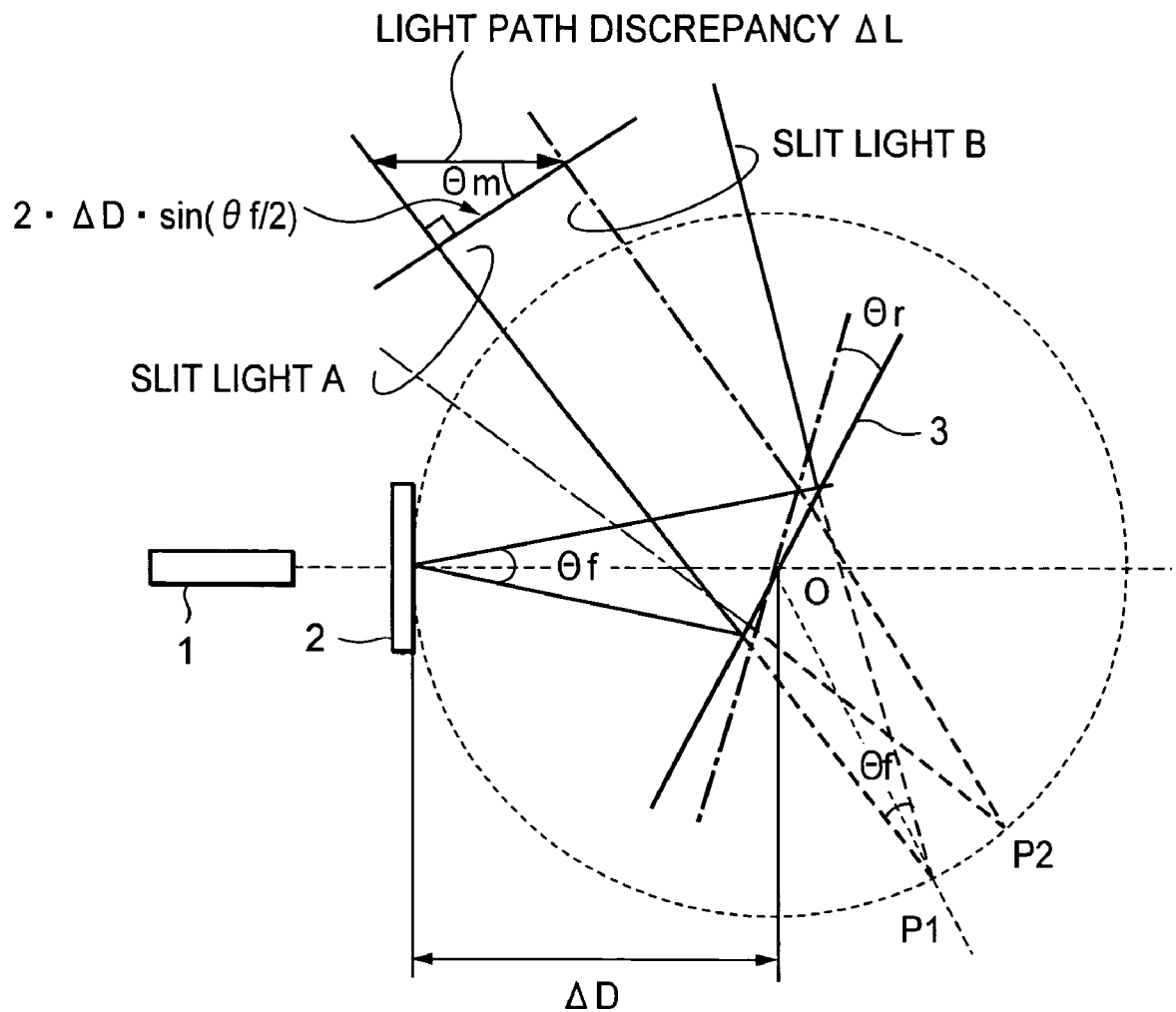
FIG. 3 is a diagram showing the optical relation from a laser source to the vicinity of a scanning mirror.

FIG. 3 is a diagram showing an optical relation from the laser source to the periphery of the scanning mirror. A beam of light emitted from the laser source 1 is separated into two beams of the slit light A and the slit light B by an angle of θf after passing through the hologram plate 2.

The slit light A and the slit light B are projected in such a manner that the centers of the slit light A and the slit light B match the center of rotation of the scanning mirror 3. Respective slit light (the slit light A and the slit light B) is reflected in accordance with an incident-angle to the scanning mirror 3 and irradiates the object to be measured.

An optical system of the slit light that is viewed from the object to be measured is equivalent to a case in which a light source is positioned at P1. It may be assumed that the two beams of the slit light are emitted from this point. Further, if the scanning mirror 3 rotates by the angle of θf, the position of such a light source moves from the point P1 to P2. In this example, it is assumed that a beam direction of the slit light A for the assumed light source at the point P1 matches a beam direction of the slit light B for the point P2.

Accordingly, a pixel of the sensor that has detected the passage of the slit A at a time corresponding to the point P1 will detect the slit light B at a time corresponding to the point P2. This relationship holds any arbitrary angle of the scanning mirror. Each pixel of the sensor detects the slit light B subsequent to the rotation of the scanning mirror 3 by the angle of θf after detecting the slit light A.

The light path of the slit light A at the time of P1 and the light path of the slit light B at the time of P2 are not in complete agreement. There is a light path discrepancy ΔL for an amount of a parallel shift. However, these light paths may be considered to be in agreement if they are viewed from each pixel of the sensor, because it may be assumed that the object to be measured is located at a sufficiently distant position with respect to ΔL.

The present embodiment will be described more in detail with an example that uses specific numeric values. In the present example, a distance ΔD from the hologram plate to the mirror is set to approximately 4 mm, and an angle of separation between the two beams of the slit light is approximately θf=2°. Under this setting, a separation width of the two beams of the slit light on the scanning mirror is 0.14 mm, and the separation width becomes about 3.5 cm on the irradiated object that is to be measured if the object is located 1 m from the scanning mirror 3. Further, the light path discrepancy ΔL is ΔL=0.16 mm (ΔL=(2·ΔDsin(θf/2))/cos(θm)), where an angle of oscillation θm=30°. This value of ΔL is a sufficiently small value if a laser spot diameter of some 2-3 mm is taken into consideration.

Further, if it is assumed that the scanning operation of the scanning mirror 3 is carried out with a speed of 15 Hz over a range of an oscillation angle of 60°, and the sensor is operated with 1.6 k frame/s, the sensor performs approximately 106 frames' operations in a single scan. In other words, it is possible to perform the detection operation of reflected light in 106 divisions. This is equivalent to dividing the angle of mirror oscillation into angles of 0.57°. Accordingly, in a case where the angle of separation of two beams of the slit light is 2°, each pixel detects the slit light B approximately 4 frames after the detection of the slit light A.

In a sensor disclosed in Patent Application No. 2001-287625 (Japanese Patent Application Laid-Open Publication No. 2003-169251), it is so designed that upon detecting the passage of the slit light, each pixel outputs data 1 while outputting data 0 in other cases. If such a sensor detects the slit light A and the slit light B, a pixel would output a data pattern of "10001" for five consecutive frame operations.

The above-mentioned settings relate to an ideal case, and settings for embodiments of the present invention are not limited to the above-mentioned settings. For example, setting the centers of two beams of the slit light to the center of rotation of the mirror or setting the rate of rotation of the mirror constant may not be required as long as a system to which the present invention is applied can tolerate possible errors caused by not having such settings as a whole.

Figure 4:
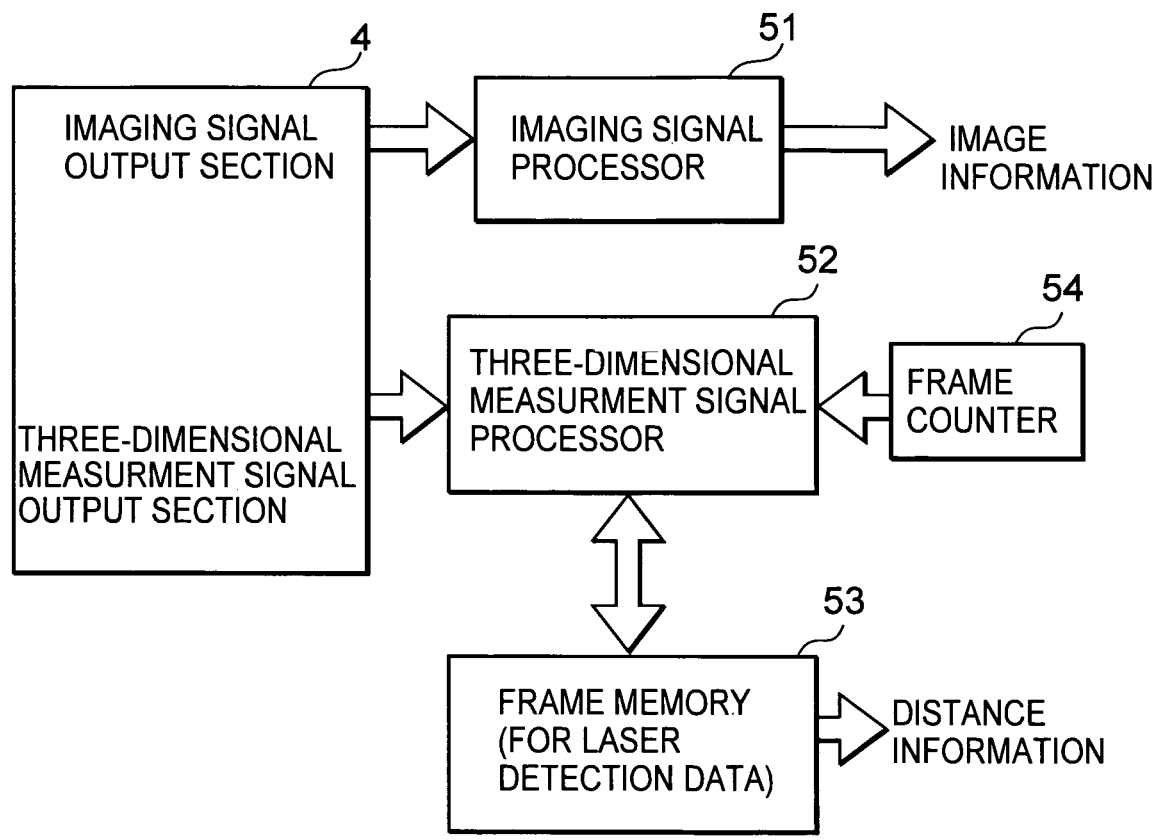
FIG. 4 is a block diagram explaining an operation means.
Figure 4:

Next, referring to the block diagram of FIG. 4, operation means for the reflected light upon receipt thereof will be described. Namely, an imaging signal and a three-dimensional measurement signal are respectively outputted from separate output sections of a sensor 4. Of these signals, the imaging signal is inputted to an imaging signal processor 51 in a way similar to the case of a typical CMOS image sensor for conversion to image information (imaging signal data).

On the other hand, the three-dimensional measurement signal is inputted to a three-dimensional measurement section (discriminating means) 52 that is connected to a frame memory 53 for data storage and a frame counter 54 for counting the number of frames. The output from the sensor 4 outputs in sequence information indicating if the reflected laser light is detected in every pixel per frame.

In this embodiment, it is assumed that "1" corresponds to data of a pixel in which the reflected laser light is detected, "0" corresponds to data of a pixel in which the reflected laser light is not detected, and an interval period between the slit light A and the slit light B is 4 frames.

Further, the frame memory 53 has a 5-bit data area for each pixel for memorizing the detection/non-detection of the reflected laser light per frame, a 3-bit memory area for data count values specifying the write position of the 5-bit data area, and a 7-bit memory area for memorizing the number of frame counts.

A frame counter 54 starts it's counting in synchronization with the start of the scanning of the scanning mirror. In the example described above, the frame operation in the sensor 4 is carried out 106 times during a single scanning operation. A frame count value obtained when two beams of the slit light are confirmed is stored in the 7-bit memory area. Accordingly, the entire memory has a capacity sufficient to store data of the total number of pixels×15 bits.

The reflected laser light detection data from the sensor 4 is sequentially read-out and sent to the three-dimensional measurement signal processor 52. At the same time, the 3-bit data count value corresponding to each pixel is read from the frame memory 53. With this data, the three-dimensional measurement signal processor 52 first determines whether or not the pixel is a pixel that has detected the laser slit light.

If the pixel is a pixel that has not detected the laser slit light, the data count is "000". If once the leading slit light A is detected, the number of frames thereafter is counted. If the pixel is in the undetected status, data from the sensor is read. If the data is "1", "1" is set at the leading bit of the frame data, and, further, the data count value is set to "001".

On the other hand, if data from the sensor is "0", it means that the slit light has not been detected. Accordingly, no write operation into the frame memory 53 is performed, and the process directly proceeds to the next operation.

Further, in the next frame operation after the pixel's detection of the slit light, data thereafter is checked because "001" is set for the data count value by the above-mentioned operation. In the checking operation, first, data from the sensor is determined as the second data D1. If the data is "0", it is written in the D1 area of the frame data as a correct data sequence and the data count value is changed to "010".

A similar operation is continued up to the fifth bit (D4) of the frame data. It is concluded that the pixel has detected the laser beam only if all the data up to the fifth bit respectively matches the initial laser pattern "10001". The 7-bit frame count value at a time of the conclusion is stored in the frame count data area.

In other words, by holding the laser pattern "10001" as a template data and comparing it with the data up to the fifth bit, the detection of the reflected laser light from the object to be measured is confirmed if these data are in agreement. If these data are not in agreement, such data is construed as a light disturbance and removed from measurement operations.

Subsequently, upon completing the single mirror scanning operation, the frame count data of each pixel is read out to outside the system. Each of the frame count values corresponds to a specific value of the mirror scanning angle and to a distance from the sensor to the object.

Accordingly, outside of the system, actual distance data may be obtained by subtracting pre-calibrated count data for a reference plane from the measured count data and performing a distance conversion operation.

The above-mentioned operation makes it easy to discriminate the light disturbance noise from the reflected laser light. For example, even if data "1" is obtained as a result of the light disturbance and no reflected laser light is measured, the possibility of having data "0001" thereafter is extremely low assuming that the light disturbance noise occurs randomly in time.

In the above-mentioned embodiment, two beams of slit light are employed. In an environment where intense changes of background light is expected, the data pattern mentioned above (for example, "10001") may occur by pure chance. In that case, the number of beams of slit light may be increased to three or more so as to provide a sharper distinction from a possible data pattern due to the environmental light. Further, the light projection pattern may not need to have the slit shape. Alternatively, any arbitrary projection pattern may be employed as long as a plurality of points of such a pattern are made available to confirm the detection of the reflected light.

Still further, in the above-mentioned embodiment, the fixed data pattern is used for discriminating the light disturbance from the actual reflected light. However, in an actual system, it is possible to have some errors in timing due to a change or deviation in the rotational speed of the scanning mirror. To counter measure such errors, it is possible to have settings which incorporate redundancy. In other words, it is not necessary to limit the slit light detection pattern (template data) to single type, and a plurality of patterns, such as "10001" or "10010", may be used. The detection of the reflected laser light may be determined if any one of the patterns are in agreement.

Figure 5:
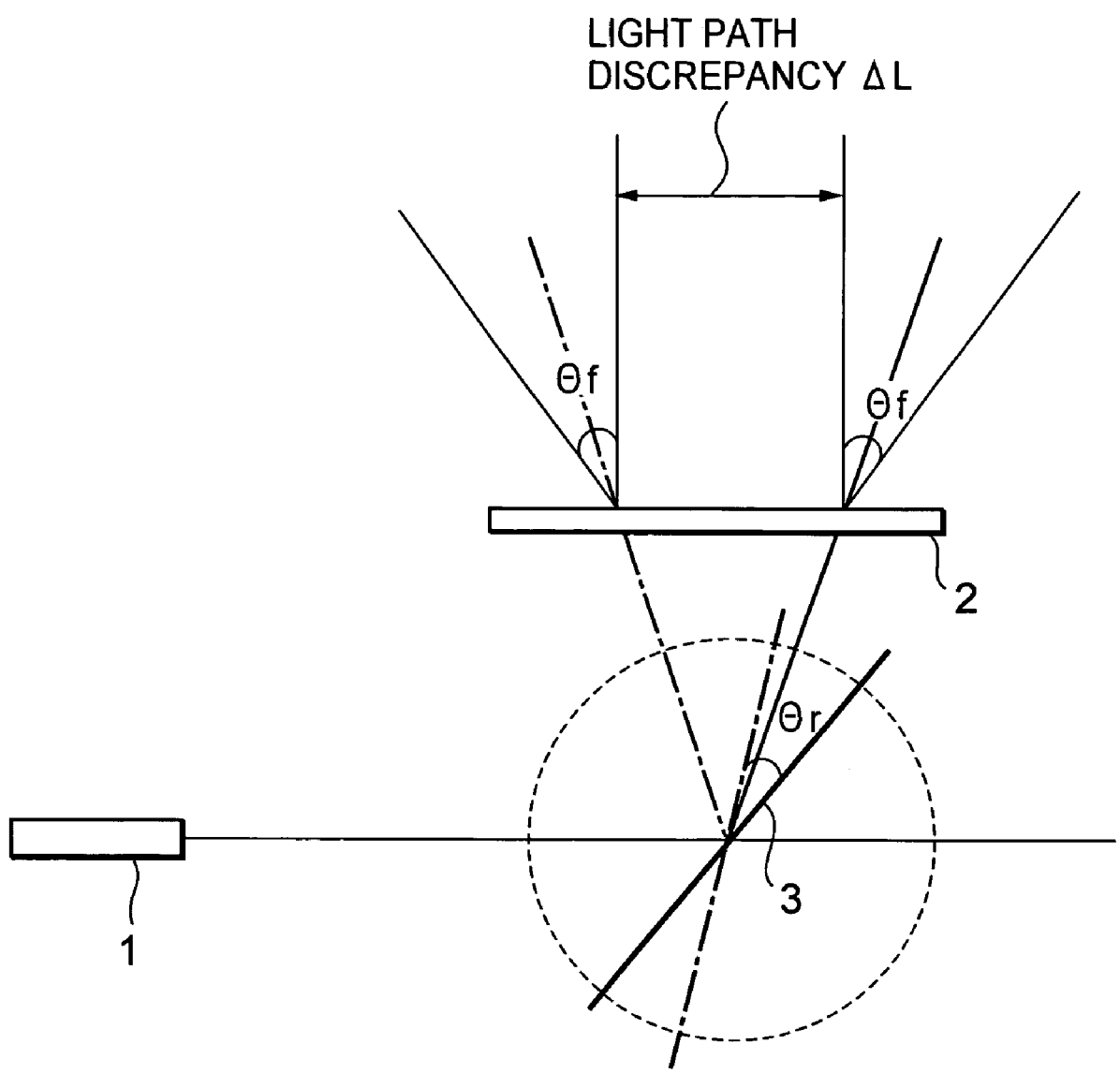
FIG. 5 is a diagram explaining another example of a hologram plate arrangement.

Furthermore, in FIG. 3, the hologram plate 2 is placed between the laser source 1 and the scanning mirror 3. Alternatively, as shown in FIG. 5, the hologram plate 2 may be placed in a subsequent stage following the scanning mirror 3. In a case where an apparatus is so constructed that the laser source 1 and the scanning mirror 3 are integrally built, an optical means according to an embodiment of the present invention may be simply realized by attaching the hologram plate 2 at an emission opening of laser light from the scanning mirror. The emission opening may be formed on a casing of the apparatus. Further, according to the structure described above, it is possible to make the optical means smaller by narrowing the spacing between the laser source 1 and the scanning mirror 3.

Figure 6:
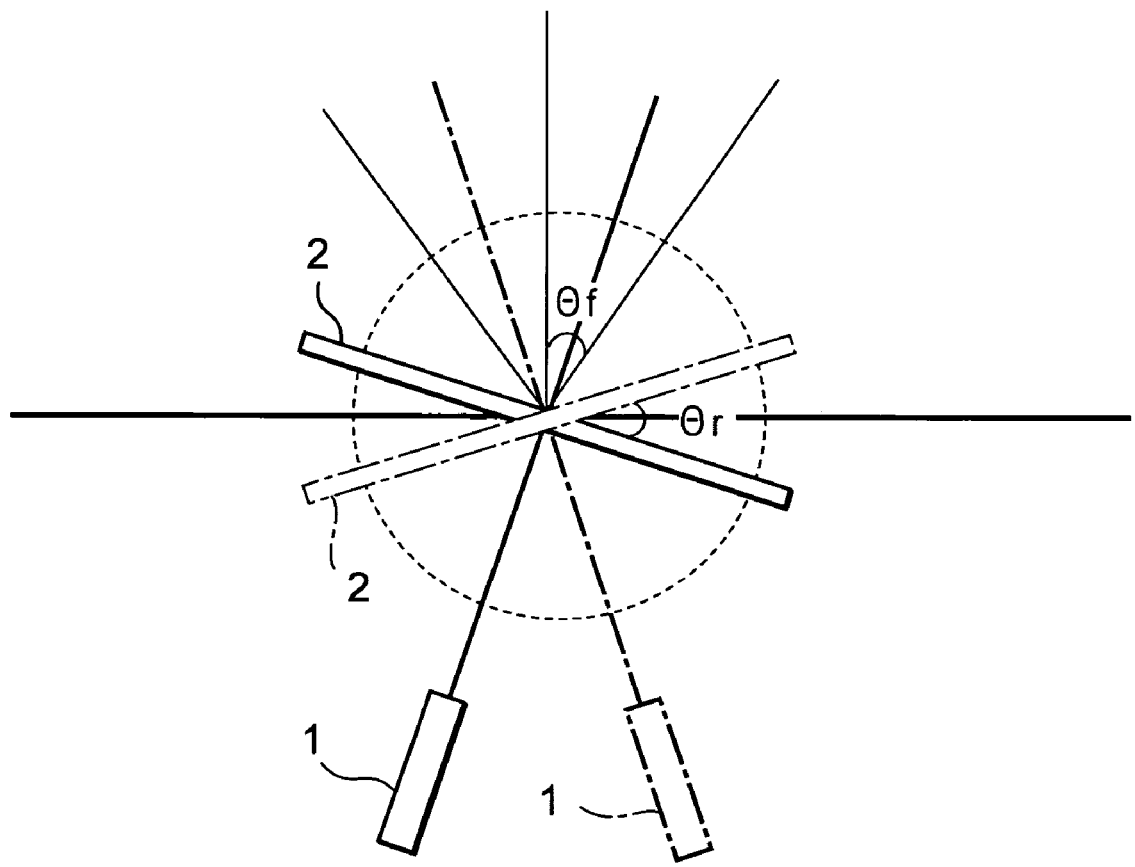
FIG. 6 is a diagram explaining an example in which a laser source is turned with a hologram plate.

Alternatively, an embodiment of the present invention may be realized without employing the scanning mirror 3. For example, as shown in FIG. 6, the hologram plate 2 and the laser source 1 may be arranged so as to rotate together. If the hologram plate 2 is set at the center of rotation, the light path discrepancy ΔL mentioned above may be made zero in principle. Further, a different arrangement for the center of rotation may be possible as long as the errors due to the different arrangement are tolerable. For example, the laser light source may be set at the center of rotation.

A three-dimensional measurement apparatus according to the present invention may be applicable in the fields of, for example, game creation, game apparatuses, personal computers, robotics, security systems, vehicle on-board apparatuses and moving image communication. The personal computer applications may include three-dimensional (stereoscopic) modeling, gesture recognition, and user interface. The robotics applications may include obstacle detection, object recognition, facial recognition (background deletion), gesture recognition and user interface. The security applications may include facial recognition, personal feature recognition and detection of an intruding object. The vehicle on-board applications may include obstacle detection, passenger detection, video phone and TV conferencing. The moving image communication application may include background extraction.

As described above, according to the embodiments of the present invention, there are the following advantages. An embodiment of the present invention allows an accurate distinction between the reflected light and the disturbance light by irradiating the object to be measured with a plurality of beams while scanning and measuring reflected light from the object. Further, an embodiment of the present invention allows the separation of disturbance light during the reflected light detection even if a small intensity of projected laser light is used, thereby enabling realization of a real-time three-dimensional measurement.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. An apparatus for measuring a three-dimensional shape of an object to be measured by irradiating and scanning the object with a laser light, the apparatus comprising:
   optical means for dividing the laser light into a plurality of beams having a predetermined angle in between for the irradiation; and
   discriminating means for reading out and discriminating each of a plurality of reflected laser light beams, the plurality of the reflected laser light beams corresponding to the plurality of divided beams, respectively, and the plurality of divided beams being used for the irradiation by the optical means,
   wherein the discriminating means reads out the plurality of reflected laser light beams reflected on the object that is irradiated by the optical means and determines whether or not an interval between the pluralities of reflected laser light beams corresponds to the predetermined angle.

2. The apparatus for measuring a three-dimensional shape according to claim 1, wherein the optical means comprises a hologram plate for dividing the laser light into the plurality of beams with the predetermined angle.

3. The apparatus for measuring a three-dimensional shape according to claim 2, wherein the optical means comprises:
   a laser light source for emitting the laser light;
   a hologram plate for dividing the laser light emitted from the laser light source into the plurality of beams with the predetermined angle; and
   a scanning mirror for scanning the plurality of beams of the laser light divided by the hologram plate.

4. The apparatus for measuring a three-dimensional shape according to claim 1, wherein the optical means comprises:
   a laser light source for emitting the laser light;
   a hologram plate for dividing the laser light emitted from the laser light source into the plurality of beams with the predetermined angle; and
   a scanning mirror for scanning the plurality of beams of the laser light divided by the hologram plate.

5. The apparatus for measuring a three-dimensional shape according to claim 1, wherein the optical means comprises:
   a laser light source for emitting the laser light;
   a scanning mirror for scanning the laser light from the laser light source; and a hologram plate for dividing a laser light scanned by the scanning mirror into the plurality of beams with the predetermined angle.

6. A method for measuring a three-dimensional shape of an object to be measured by irradiating and scanning the object with a laser light, the method comprising:

dividing the laser light into a plurality of beams having a predetermined angle in between for the irradiation;

reading out each of a plurality of reflected laser light beams, the plurality of the reflected laser light beams corresponding to the plurality of divided beams, respectively, and the plurality of divided beams being used for the irradiation; and generating three dimensional shape data for said object by determining whether or not an interval between the plurality of reflected laser light beams corresponds to the predetermined angle and generating the three dimensional shape data for said object when said interval corresponds to the predetermined angle.

7. The method for measuring a three-dimensional shape of an object according to claim 6, wherein the determination of whether or not the interval corresponds to the predetermined angle is performed by comparing read-out reflected light data and a predetermined template data.

8. The method for measuring a three-dimensional shape of an object according to claim 7, wherein the predetermined template data includes a plurality of patterns.

9. The method for measuring a three-dimensional shape of an object according to claim 6, wherein said determining step distinguishes read out reflected light beams reflected from said object from reflected light beams caused by a light disturbance.

* * * * *